United States Patent
Katsurahira

(10) Patent No.: US 10,795,491 B2
(45) Date of Patent: Oct. 6, 2020

(54) POSITION DETECTING DEVICE THAT SELECTS ELECTRODES HAVING DIFFERENT INTERVALS THEREBETWEEN WHILE DIFFERENT SIGNALS ARE DETECTED

(71) Applicant: Wacom Co., Ltd., Saitama (JP)

(72) Inventor: Yuji Katsurahira, Saitama (JP)

(73) Assignee: Wacom Co., Ltd., Saitama (JP)

( * ) Notice: Subject to any disclaimer, the term of this patent is extended or adjusted under 35 U.S.C. 154(b) by 165 days.

(21) Appl. No.: 15/612,686

(22) Filed: Jun. 2, 2017

(65) Prior Publication Data
US 2017/0269776 A1    Sep. 21, 2017

Related U.S. Application Data

(63) Continuation of application No. PCT/JP2015/080873, filed on Nov. 2, 2015.

(30) Foreign Application Priority Data

Jan. 6, 2015 (JP) ................................ 2015-000850

(51) Int. Cl.
*G06F 3/045* (2006.01)
*G06F 3/041* (2006.01)
(Continued)

(52) U.S. Cl.
CPC .......... *G06F 3/0416* (2013.01); *G06F 3/0383* (2013.01); *G06F 3/03545* (2013.01);
(Continued)

(58) Field of Classification Search
CPC ... G06F 3/0416; G06F 3/03545; G06F 3/0383
(Continued)

(56) References Cited

U.S. PATENT DOCUMENTS 5,798,756 A    8/1998 Yoshida et al.
2010/0155153 A1*  6/2010 Zachut ................ G06F 3/03545
                                                    178/18.03
(Continued)

FOREIGN PATENT DOCUMENTS

CN    103257740 A    8/2013
CN    103324368 A    9/2013
(Continued)

OTHER PUBLICATIONS

Chinese Office Action, dated Sep. 27, 2019, for Chinese Application No. 201580063017.4, 24 pages. (with English translation).

*Primary Examiner* — Jonathan M Blancha
(74) *Attorney, Agent, or Firm* — Seed IP Law Group LLP

(57) ABSTRACT

A position detecting device obtains information from a stylus when the stylus moves at high speed, while removing influences of noise. The position detecting device includes a differential amplification circuit that amplifies and outputs a difference in a signal at a first terminal and a signal at a second terminal, and a selection circuit that selects at least a first electrode of a sensor, connects at least the first electrode to the first terminal of the differential amplification circuit, selects at least a second electrode of the sensor, and connects at least the second electrode to the second terminal of the differential amplification circuit. The selection circuit selects electrodes separated by a first interval in a period in which a position indicated by the stylus is detected, and selects electrodes separated by a second interval that is shorter than the first interval in a period in which data is detected.

20 Claims, 12 Drawing Sheets

(51) Int. Cl.
    *G06F 3/046*     (2006.01)
    *G06F 3/0354*     (2013.01)
    *G06F 3/038*     (2013.01)
    *G06F 3/044*     (2006.01)

(52) U.S. Cl.
    CPC .............. *G06F 3/044* (2013.01); *G06F 3/046* (2013.01); *G06F 2203/04105* (2013.01); *G06F 2203/04106* (2013.01)

(58) Field of Classification Search
    USPC ........................................................ 345/174
    See application file for complete search history.

(56) References Cited

U.S. PATENT DOCUMENTS

| | | | | |
|---|---|---|---|---|
| 2010/0328240 | A1* | 12/2010 | Matsubara | G06F 3/0412 345/173 |
| 2011/0090146 | A1* | 4/2011 | Katsurahira | G06F 3/03545 345/156 |
| 2013/0207938 | A1* | 8/2013 | Ryshtun et al. | G06F 3/03545 345/179 |
| 2013/0215049 | A1* | 8/2013 | Lee | G06F 3/0416 345/173 |
| 2013/0249854 | A1* | 9/2013 | Katsurahira | G06F 3/0416 345/174 |
| 2014/0078101 | A1 | 3/2014 | Katsurahira | |

FOREIGN PATENT DOCUMENTS

| | | | |
|---|---|---|---|
| JP | 63-70326 | A | 3/1988 |
| JP | 6-187088 | A | 7/1994 |
| JP | 8-179887 | A | 7/1996 |
| JP | 2014-63249 | A | 4/2014 |

\* cited by examiner

CIRCUIT EXAMPLE OF STYLUS PEN

SIGNAL WAVEFORM OF STYLUS PEN

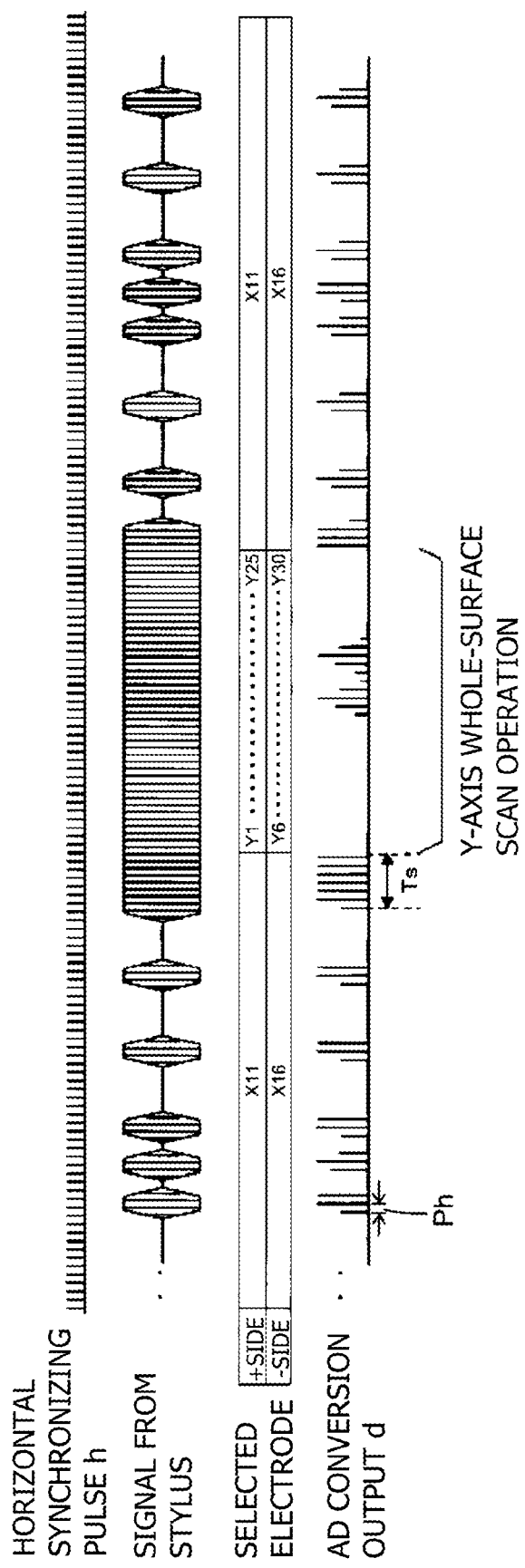

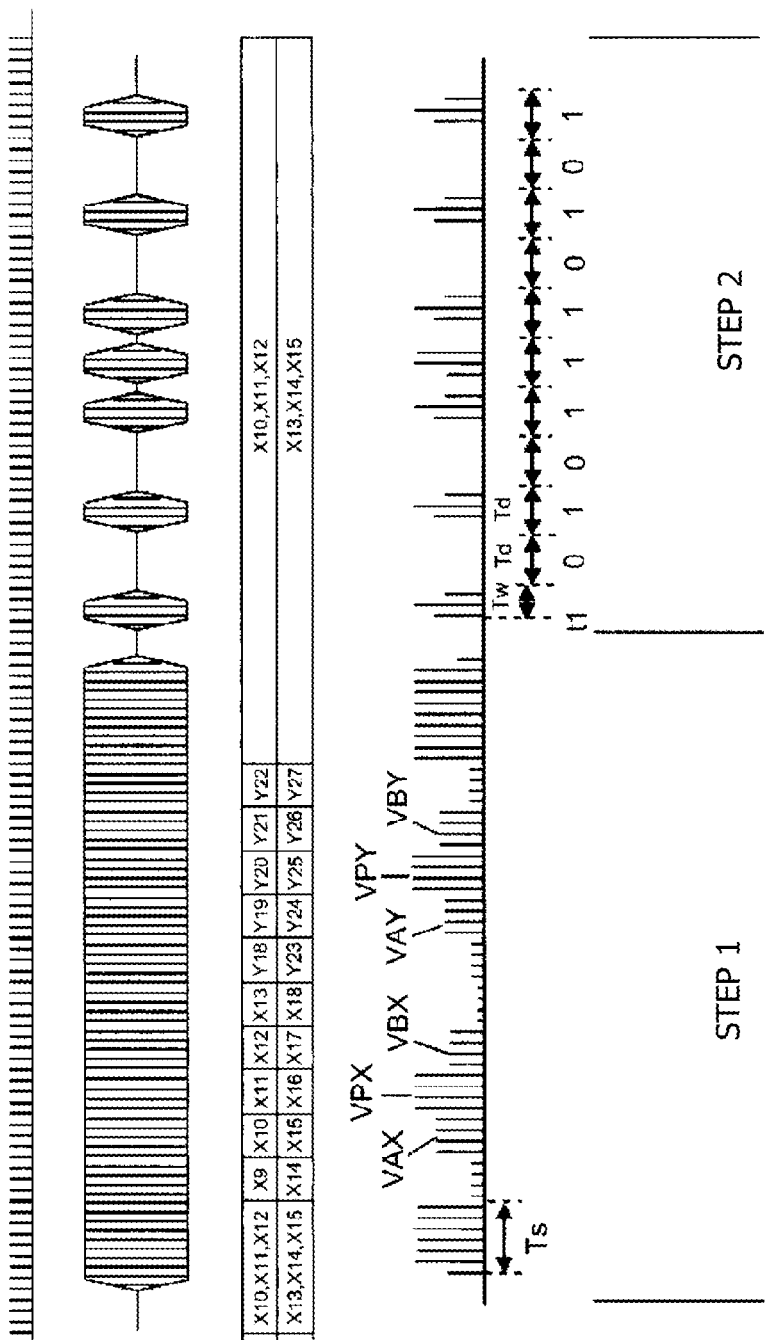

FIG.10 EXISTING SELECTION METHOD
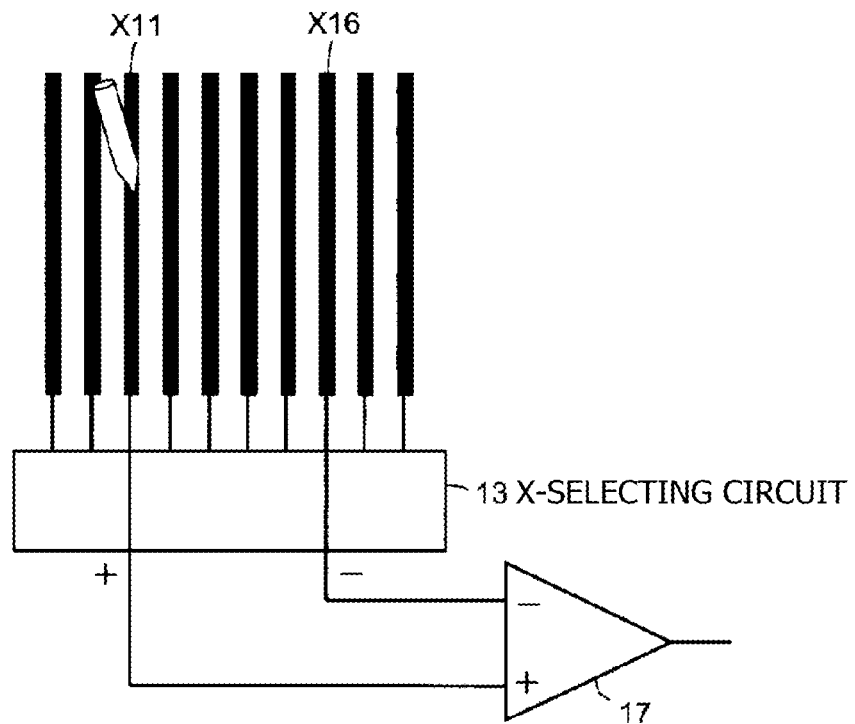
FIG.11
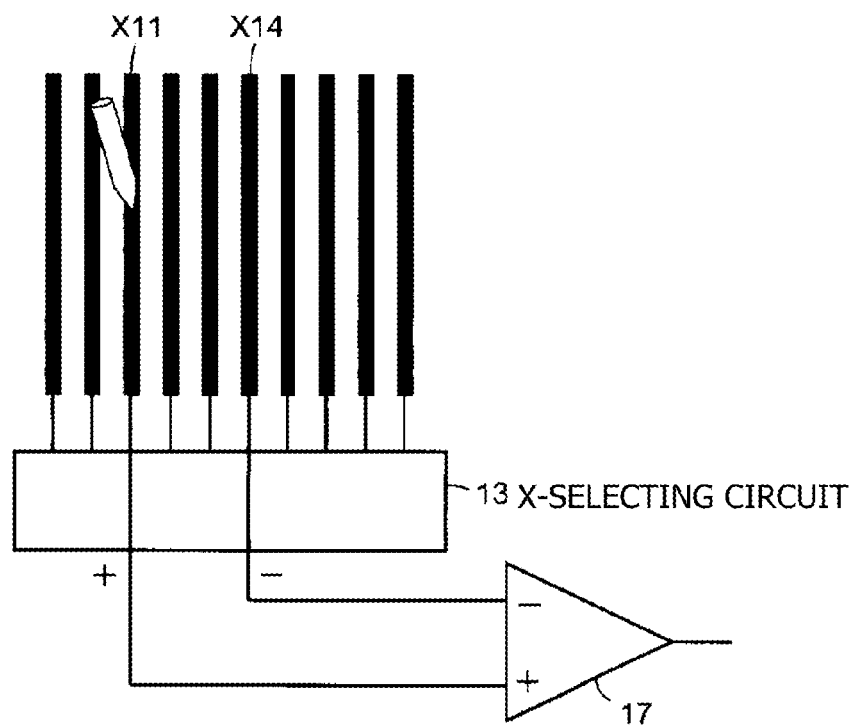

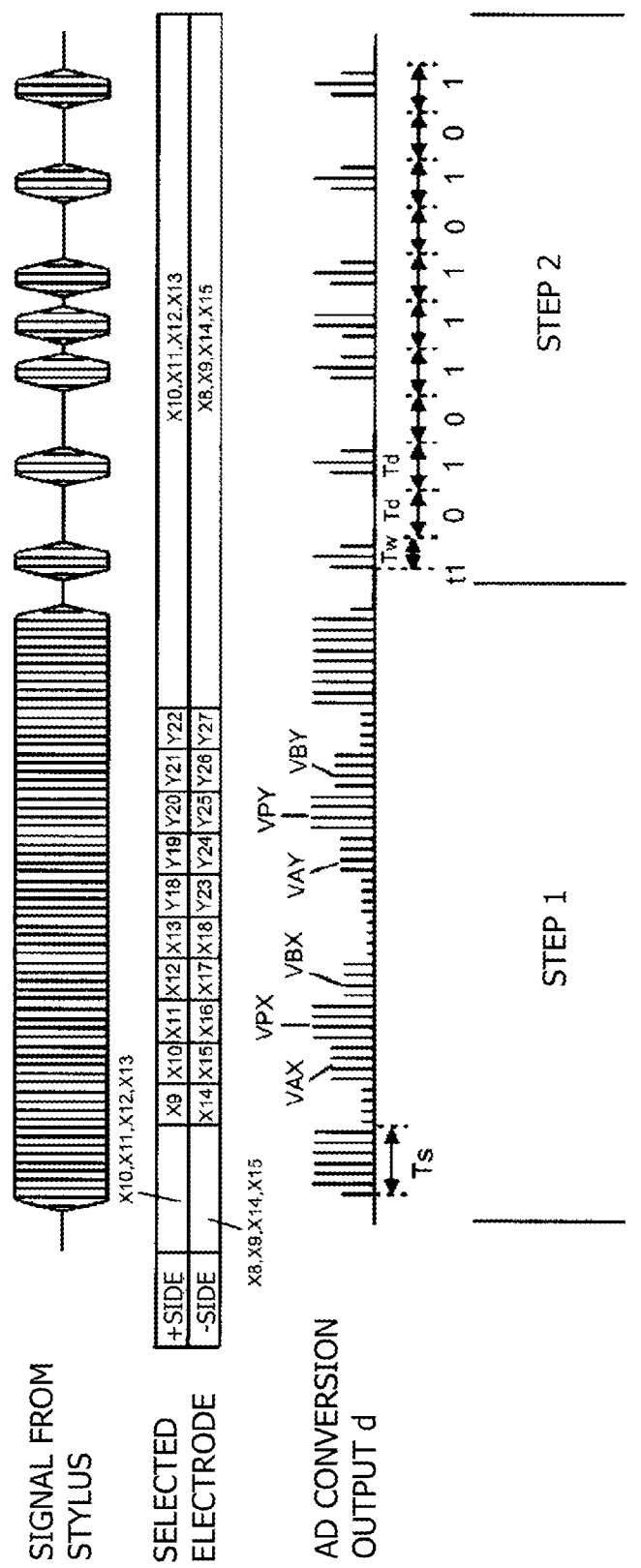

POSITION DETECTING DEVICE THAT SELECTS ELECTRODES HAVING DIFFERENT INTERVALS THEREBETWEEN WHILE DIFFERENT SIGNALS ARE DETECTED

BACKGROUND

Technical Field

This disclosure relates to a position detecting device including a transparent sensor that is disposed over a front surface of a display device and that can be operated by both of a finger and a pen-type position indicator (hereinafter, a pen-type position indicator will be referred to as stylus pen).

Description of Related Art

In recent years, there has been a configuration that allows input by a stylus pen in order to easily carry out handwriting character input and drawing of pictures, illustrations, and so forth regarding input of a computer. As a pen input technique for this purpose, a method disclosed in Patent Document 1 (Japanese Patent Laid-open No. 1988-70326) has been widely used.

According to the method of the above-described Patent Document 1, a position indicator that is a stylus pen is provided with a resonant circuit and an indicated position is detected by electromagnetic induction with a sensor of a tablet as a position detecting device. In this system, transmission and reception of signals are carried out by resonance operation between coils (sensor coils=loop coils) on the sensor side of the position detecting device and the resonant circuit that is incorporated in the stylus pen and that is composed of a coil and a capacitor.

In the position detecting device, a sensor coil near the position of the stylus pen is selected and a signal is transmitted from the sensor coil. The stylus pen receives it by the coil of the resonant circuit and returns a signal toward the sensor coil. Plural kinds of information are included in the returned signal in some cases. As the information from the stylus pen, there are signals for position detection, writing pressure information, and so forth. In the position detecting device, even when the stylus pen is moving, with following thereof, a signal is transmitted from the sensor coil near the stylus pen and an exchange of information is carried out with the position indicator.

In recent years, tablet-type information terminals equipped with a touch panel have come to be frequently used. In a tablet disclosed in the above-described Patent Document 1, a sensor that forms the tablet needs to be provided on the back surface of a display device. This is because a certain level of current needs to be made to flow in loop coils provided as sensor coils and therefore it is impossible to make the sensor transparent.

For this reason, a sensor of a capacitive system obtained by making a sensor transparent by using transparent electrodes of indium tin oxide (ITO) or the like has become the mainstream in recent years. However, this transparent sensor has problems. One of the problems is a problem that, because the sensor is disposed over a display screen of a display device in an overlapping manner, the sensor receives the influence of noise emitted by the display device, e.g. a liquid crystal or the like, and it becomes difficult to correctly obtain the coordinate position. Furthermore, the electrodes composed of ITO have a high resistance value relative to a conductor based on a conventional copper line. Therefore, it is difficult to carry out signal transmission and reception in which a signal is transmitted from the sensor of the tablet and the signal is received by a stylus pen to be returned to the sensor.

As one of a stylus pen of the capacitive system and a position detecting device to solve this problem, there is a system in which the stylus pen has a power supply and a signal is unilaterally sent out from the stylus pen side to the sensor side of the position detecting device. Position detecting devices having this system have been increasing (refer to Patent Document 2 (Japanese Patent Laid-open No. 2014-63249)).

PRIOR ART DOCUMENTS

Patent Documents

Patent Document 1: Japanese Patent Laid-open No. 1988-70326

Patent Document 2: Japanese Patent Laid-open No. 2014-63249

BRIEF SUMMARY

Technical Problems

The sensor of the position detecting device described in the above-described Patent Document 2 is a sensor in which plural transparent electrodes are disposed in each of directions orthogonal to each other. When the position of a finger as an indicating body is detected by the position detecting device of this Patent Document 2, a signal is made to sequentially flow to the plural electrodes disposed in one direction of the orthogonal directions and change in the signal is detected by the plural electrodes disposed in the other direction. Furthermore, when detecting a position indicated by the stylus pen, the position detecting device of Patent Document 2 carries out the detection while sequentially switching the plural electrodes of one and the other directions.

The stylus pen used in this Patent Document 2 is characterized by including a power supply and unilaterally transmitting a signal to the sensor side. Furthermore, in the position detecting device, a received signal from the stylus pen received by the transparent electrodes of the sensor is amplified by using a differential amplification circuit and thereby exogenous noise included in the received signal is cancelled out. In this case, in the signal transmitted from the stylus pen, information such as a signal for position detection for detection of a position indicated by the stylus pen and information on the value of the writing pressure applied to the pen tip of the stylus pen is included. The stylus pen transmits the information on the writing pressure value and so forth to the sensor as amplitude shift keying (ASK)-modulated data (attendant information).

Furthermore, the detection of the position indicated by the stylus pen in the position detecting device is carried out by scanning all electrodes on the sensor regarding the signal for position detection from the stylus pen and based on signal distribution acquired in the scanning. In this position detection, after all electrodes on the sensor are scanned (global scan) to narrow down the indicated position of the stylus pen to some extent, processing of deciding a more detailed position is executed (partial scan).

Furthermore, in the position detecting device, as for the attendant information such as the information on the writing pressure value, a signal is received by the electrode nearest to the indicated position of the stylus pen identified by the signal for position detection and thereby the attendant information is obtained.

The purpose of using the differential amplification circuit in the position detecting device described in Patent Document 2 is to cancel noise that gets mixed in the signal received from the stylus pen. In the position detecting device described in Patent Document 2, the sensor electrode connected to the positive terminal of the differential amplification circuit and the sensor electrode connected to the negative terminal in the partial scan at the time of position detection processing based on the signal for position detection are each one electrode and are separated by a predetermined distance. The reason why the electrodes separated by the predetermined distance are selected is as follows. Specifically, the intensity of the signal is important in the case of detecting the signal for position detection. However, if the electrodes connected to the positive terminal and negative terminal of the differential amplification circuit are adjacent, the signal for position detection from the stylus pen is similarly received in the adjacent electrodes and the signal for position detection that should be detected originally is cancelled out by differential amplification, so that the signal intensity thereof becomes low.

However, meanwhile, the effect of noise reduction by differential amplification is lowered when the distance between the electrodes connected to the positive terminal and negative terminal of the differential amplification circuit is set longer, so that the position detection processing receives the influence of noise.

At the time of reception of a signal for data detection in this position detecting device, the electrodes connected to the positive terminal and negative terminal of the differential amplification circuit are each fixed as one electrode of the sensor nearest to the indicated position by the stylus pen, detected in the partial scan of the position detection processing based on the signal for position detection.

In the partial scan at the time of position detection, the above-described electrodes separated by the predetermined distance are connected to the positive terminal and negative terminal of the differential amplification circuit and the indicated position by the stylus pen is detected. Thus, what is detected as the sensor electrode nearest to the indicated position by the stylus pen is a respective one of these electrodes separated by the predetermined distance. For this reason, at the time of reception of the signal for data detection in the position detecting device, the electrodes connected to the positive terminal and negative terminal of the differential amplification circuit are electrodes separated by the predetermined distance as in the position detection. Therefore, in the case of Patent Document 2, the signal including the attendant information to be detected is greatly affected by noise in the position detecting device.

Moreover, in recent years, the cases in which attendant information such as identification information (identification (ID)) of a stylus pen is also transmitted to the sensor side besides information on the writing pressure value have been increasing. Furthermore, the data size gradually becomes larger also in the identification information and the cases in which the attendant information is sent over a long time after transmission of the signal for position detection have been increasing. Specifically, there arise the need to set data of the writing pressure value to e.g. 12 bits due to increase in the level of detail of the writing pressure data although conventionally the data of the writing pressure value is approximately 8 bits, and to transmit identification information of approximately 30 bits specific to a stylus pen.

The attendant information transmitted from the stylus pen as the signal for data detection in an attendant information transmission period is received from one electrode connected to one of the positive terminal and negative terminal of the differential amplification circuit. However, there is also the case in which the stylus pen gets far away from the above-described one receiving electrode before the attendant information transmitted from the stylus pen can be completely received, such as the case in which the stylus pen is moved on the sensor at high speed by the user. In such a case, in the position detecting device, there is a possibility that it becomes impossible to correctly receive the attendant information from the stylus pen and the correctness of the writing pressure data is lost or identification information is incorrectly detected.

In view of the above problems, this disclosure intends to provide a position detecting device configured to be capable of correctly obtaining attendant information from a stylus pen stably even when the stylus pen moves at high speed while removing the influence of noise.

Technical Solution

In order to solve the above-described problems, this disclosure provides a position detecting device having a transparent sensor that includes a plurality of electrodes composed of a transparent electrically-conductive material arranged in each of a first direction and a second direction intersecting each other and that is disposed over a display device, the position detecting device receiving a position detection signal by which a position on the sensor is detected and a data signal generated according to digital data from a stylus pen, the position detecting device including: a differential amplification circuit that has a first terminal and a second terminal and, in operation, amplifies and outputs a difference between a signal at the positive terminal and a signal at the negative terminal; and a selection circuit that, in operation, selects a first electrode group including at least a first electrode of the electrodes included in the sensor, connects the first electrode group to the first terminal, selects a second electrode group including at least a second electrode of the electrodes included in the sensor, and connects the second electrode group to the second terminal; wherein the selection circuit, in operation, selects electrodes separated by a first interval as the first electrode and the second electrode in a period in which the position on the sensor indicated by the stylus pen is detected based on the position detection signal, and the selection circuit, in operation, selects electrodes separated by a second interval as the first electrode and the second electrode in a period in which the data signal is detected, wherein the second interval is shorter than the first interval.

According to the position detecting device in accordance with this disclosure with the above-described configuration, in the differential amplification circuit, in the period in which the data signal is detected, an interval between an electrode connected to the first terminal and an electrode connected to the second terminal is set to a shorter interval than an interval between the electrodes in the period in which the indicated position by the stylus pen is detected. Therefore, the noise reduction effect due to the differential amplification becomes larger and it becomes possible to more correctly detect attendant information from the data signal.

Furthermore, according to the position detecting device in accordance with this disclosure, the first electrode group composed of plural electrodes in which the first electrode is included and the second electrode group composed of plural electrodes in which the second electrode is included are connected to the first terminal and second terminal of the differential amplification circuit. Thus, it is possible to acquire the data signal from these plural electrodes even when the stylus pen moves at high speed. Therefore, it becomes possible to completely acquire the attendant information. Accordingly, the attendant information can be correctly obtained stably even when the stylus pen moves at high speed.

Furthermore, this disclosure is preferable if the following configuration is employed. Specifically, in the period in which the data signal is detected, the selection circuit selects electrodes or electrode groups adjacent to each other as the first electrode group and the second electrode group. Moreover, one of the first electrode group and the second electrode group is composed of plural electrodes adjacent to each other and plural electrodes of the other of the first electrode group and the second electrode group are composed of electrodes dispersed on both sides of the electrode group composed of the plural electrodes adjacent to each other.

In this case, in reception of data such as writing pressure data from the stylus pen, a predetermined number of successive electrodes centered at the indicated position of the stylus pen are selected and connected to the positive terminal (or negative terminal) of the differential amplification circuit. Furthermore, in such a manner as to be dispersed on two sides of the selected electrodes, the same number of electrodes are selected and connected to the negative terminal (or positive terminal). Due to this, even when the stylus pen moves at high speed, the indicated position of the pen does not get out of the area selected and connected to the above-described positive terminal (or negative terminal) and the data such as the writing pressure data can be surely received. Thus, a discontinuity of a line does not occur even when rapid writing or drawing is carried out, and input with favorable operability can be made.

Furthermore, because the same number of electrodes are selected and connected to the negative terminal (or positive terminal) in such a manner as to be dispersed on two sides of the area of the electrode group selected as the positive terminal (or negative terminal), noise can be surely cancelled even when plural electrodes are selected and connected to each of the positive terminal and negative terminal of the differential amplification circuit, and the position detecting device stably operates.

Advantageous Effect

According to this disclosure, it is possible to provide a position detecting device configured to be capable of correctly obtaining attendant information from a stylus pen stably even when the stylus pen moves at high speed while removing the influence of noise.

BRIEF DESCRIPTION OF THE DRAWINGS

FIG. 8 is a diagram showing a transition operation to a partial scan in a position detecting device according to one or more embodiments of this disclosure.

FIG. 9 is a diagram showing a partial scan operation in a position detecting device according to one or more embodiments of this disclosure.

FIG. 10 is a diagram for explaining an existing example of a selection method of electrodes in detection processing of attendant information in a position detecting device.

FIG. 11 is a diagram for explaining an example of a selection method of electrodes in detection processing of attendant information in a position detecting device according to one or more embodiments of this disclosure.

FIG. 16 is a diagram showing a partial scan operation in a position detecting device according to one or more embodiments of this disclosure.

MODES FOR CARRYING OUT THE DISCLOSURE

Figure 1:
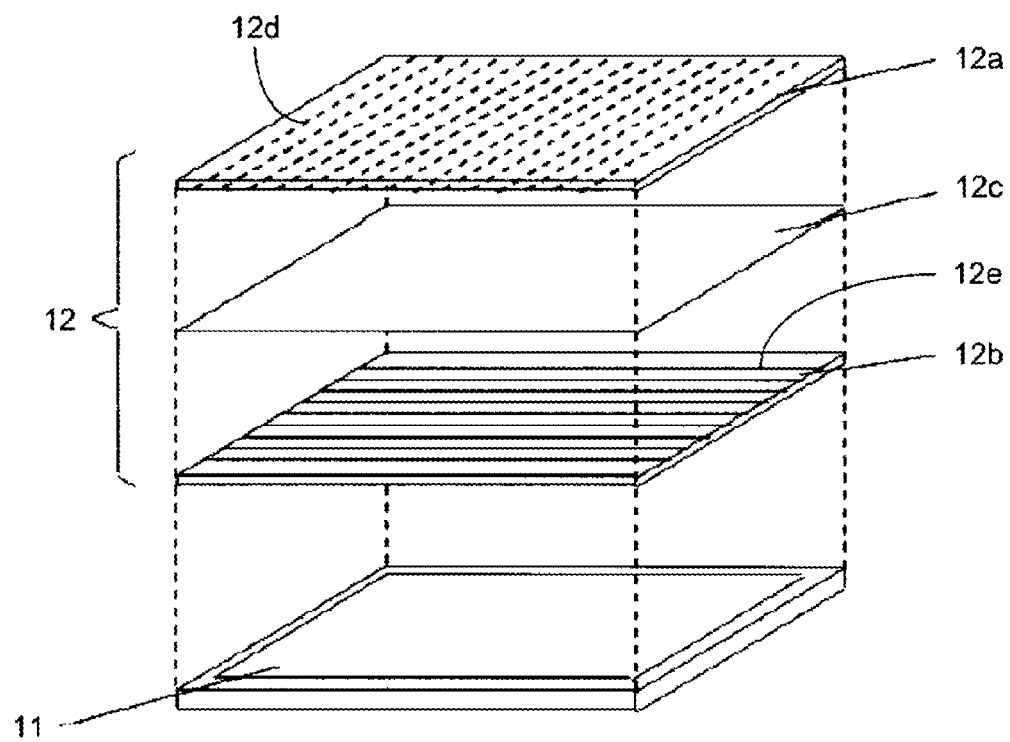
FIG. 1 is a diagram showing a configuration of a transparent sensor of a position detecting device according to one or more embodiments of this disclosure.

FIG. 1 is a diagram showing a configuration of a transparent sensor combined with a display unit integrally in a position detecting device according to one or more embodiments of this disclosure. In FIG. 1, numeral 11 denotes a liquid crystal display (LCD) panel and numeral 12 denotes a transparent sensor having electrodes formed by indium tin oxide (ITO). Numeral 12a denotes ITO glass obtained by arranging plural X-electrodes 12d formed of lines of the ITO electrodes in the X-direction, of the X-direction and the Y-direction orthogonal to each other. Numeral 12b denotes ITO glass obtained by arranging plural Y-electrodes 12e formed of lines of the ITO electrodes in the Y-direction. Numeral 12c denotes a transparent insulating sheet having a uniform thickness and is formed of a polyethylene terephthalate (PET) film, for example.

The transparent sensor 12 is made by bonding the ITO glass 12a and the ITO glass 12b in such a manner that the respective ITO surfaces are made to face each other and the transparent insulating sheet 12c is interposed therebetween. The transparent sensor 12 is disposed to overlap with the LCD panel 11 in such a manner that the position detection area just overlaps with the display area of the LCD panel 11.

The X-electrodes 12d on the ITO glass 12a and the Y-electrodes 12e on the ITO glass 12b are connected to a printed circuit board, not shown in the diagram, via a flexible board, not shown in the diagram, by an anisotropic conductive film (ACF) connection.

Figure 2:
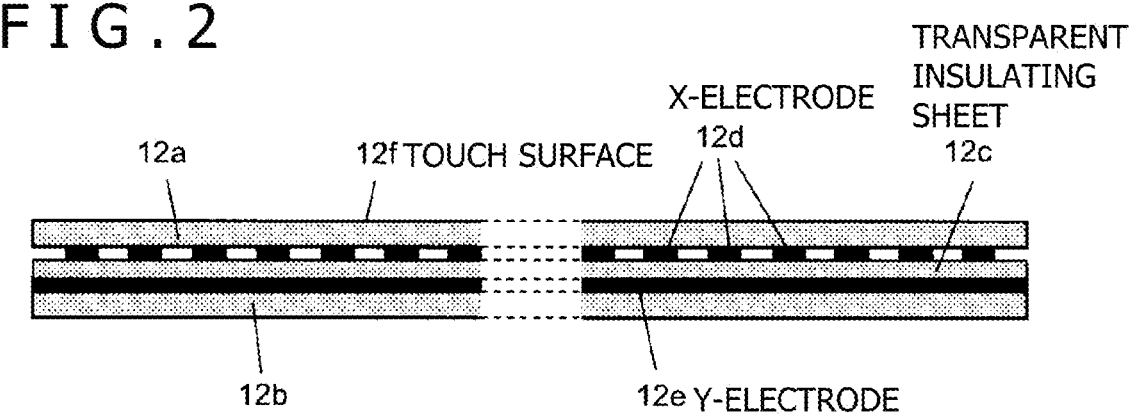
FIG. 2 is a sectional view of the transparent sensor of the example of FIG. 1.

FIG. 2 is a sectional view obtained by cutting the transparent sensor 12 over the Y-electrode 12e. In this embodiment, the side of the ITO glass 12a is the operation surface side and the exposed surface to the external in this ITO glass 12a serves as a touch surface 12f.

Figure 3:
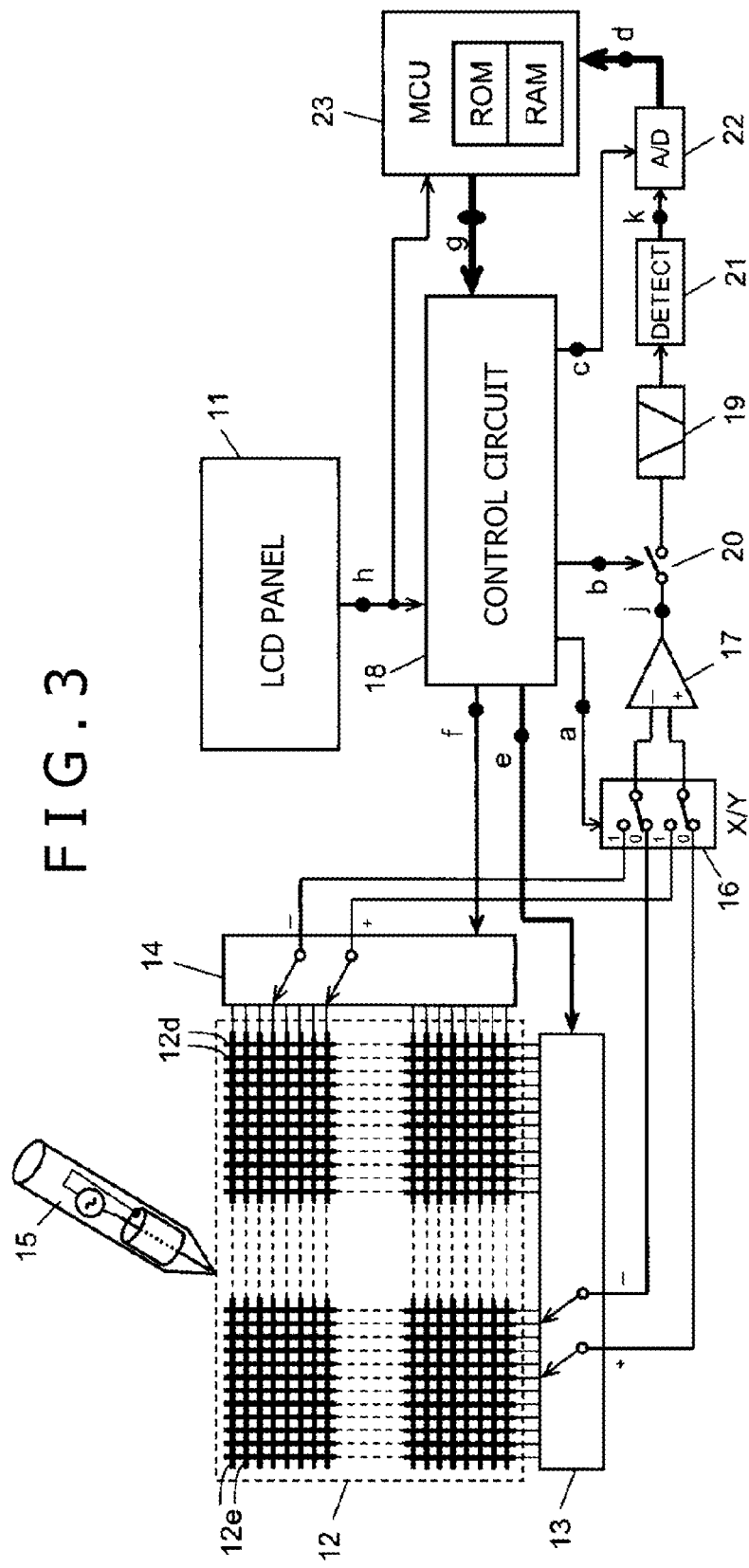
FIG. 3 is a configuration diagram of a position detecting device according to one or more embodiments of this disclosure.

FIG. 3 is a configuration diagram of a position detecting device according to one or more embodiments of this disclosure. In FIG. 3, numeral 12 denotes the transparent sensor. Numeral 13 denotes an X-electrode selection circuit that is connected to the X-electrodes 12d of the transparent sensor 12 and selects two pairs of electrodes from the X-electrodes 12d for connection to a positive terminal and a negative terminal of a differential amplification circuit 17, respectively. Numeral 14 denotes a Y-electrode selection circuit that is connected to the Y-electrodes 12e of the transparent sensor 12 and selects two pairs of electrodes from the Y-electrodes 12e for connection to the positive terminal and a negative terminal of the differential amplification circuit 17, respectively. In the present embodiment example, a description will be made based on the assumption that the number of X-electrodes 12d is 40 (X1 to X40) and the number of Y-electrodes 12e is 30 (Y1 to Y30).

In FIG. 3, the X-electrode selection circuit 13 and the Y-electrode selection circuit 14 are so shown as to select one electrode among the plural X-electrodes 12d and the plural Y-electrodes 12e of the transparent sensor 12 for connection to each of the positive terminal and the negative terminal of the differential amplification circuit 17. However, these X-electrode selection circuit 13 and Y-electrode selection circuit 14 are configured to be capable of simultaneously selecting plural electrodes among the plural X-electrodes 12d and the plural Y-electrodes 12e of the transparent sensor 12 for connection to each of the positive terminal and the negative terminal of the differential amplification circuit 17.

Numeral 15 denotes a stylus pen 15, and a signal of a constant frequency is supplied between an electrode at the tip part and a peripheral electrode surrounding it.

Numeral 16 denotes a switching circuit, and it selects one or more electrodes selected by the X-electrode selection circuit 13 or one or more of the electrodes selected by the Y-electrode selection circuit 14 and connects the selected electrodes to the differential amplification circuit 17. Specifically, when the X-axis coordinate of the position indicated by the stylus pen 15 is obtained, a control signal a from a control circuit 18 is set to a low level "0" to select one or more electrodes selected by the X-electrode selection circuit 13. Furthermore, when the Y-axis coordinate of the position indicated by the stylus pen 15 is obtained, the control signal a is set to a high level "1" to select one or more electrodes selected by the Y-electrode selection circuit 14. In this case, one or more electrodes selected by the X-electrode selection circuit 13 for connection to the positive terminal of the differential amplification circuit 17 or one or more electrodes selected by the Y-electrode selection circuit 14 for connection to the positive terminal of the differential amplification circuit 17 is connected to a non-inverting input terminal (positive terminal) of the differential amplification circuit 17 and one or more electrodes selected by the X-electrode selection circuit 13 for connection to the negative terminal of the differential amplification circuit 17 or one or more electrodes selected by the Y-electrode selection circuit 14 for connection to the negative terminal of the differential amplification circuit 17 is connected to an inverting input terminal (negative terminal) of the differential amplification circuit 17.

Numeral 19 denotes a band-pass filter circuit having a predetermined bandwidth centered at the frequency of the signal output by the stylus pen 15, and an output signal j from the differential amplification circuit 17 is supplied thereto through a switch 20. The switch 20 is controlled to the on-state or off-state by a control signal b from the control circuit 18. Specifically, when the control signal b is at the high level "1," the switch 20 is set to an on-state and the output signal j from the differential amplification circuit 17 is supplied to the band-pass filter circuit 19. When the control signal b is at the low level "0," the switch 20 is set to an off-state and the output signal j from the differential amplification circuit 17 is not supplied to the band-pass filter circuit 19.

An output signal k of the band-pass filter circuit 19 is subjected to detection by a detection circuit 21 and is converted to a digital value by an analog-to-digital conversion circuit (hereinafter, abbreviated as the AD conversion circuit) 22 based on a control signal c from the control circuit 18. Digital data d from this AD conversion circuit 22 is read and processed by a microprocessor (MCU) 23. Here, a period during which the switch 20 is in the on-state is a reception period in which sampling is carried out by the AD conversion circuit 22 and a signal is converted to a digital signal. A period during which the switch 20 is in the off-state is a reception-stopped period in which sampling is not carried out by the AD conversion circuit 22. The reception period and the reception-stopped period alternate based on the on-state and off-state of the switch 20.

The control circuit 18 supplies a control signal e to the X-electrode selection circuit 13 and thereby the X-electrode selection circuit 13 selects two pairs of X-electrodes for connection to the positive terminal and the negative terminal of the differential amplification circuit 17, respectively. Furthermore, the control circuit 18 supplies a control signal f to the Y-electrode selection circuit 14 and thereby the Y-electrode selection circuit 14 selects two pairs of Y-electrodes for connection to the positive terminal and the negative terminal of the differential amplification circuit 17, respectively.

The microprocessor 23 internally includes a read only memory (ROM) and a random access memory (RAM) and operates by a program stored in the ROM.

The microprocessor 23 outputs a control signal g based on the program stored in the ROM to control the control circuit 18 so that the control circuit 18 may output the control signals a to f at predetermined timings. The control circuit 18 generates the control signals a to f to carry out signal reception and AD conversion in synchronization with a horizontal synchronizing pulse h.

[Configuration Example of Stylus Pen 15]

Figure 4:
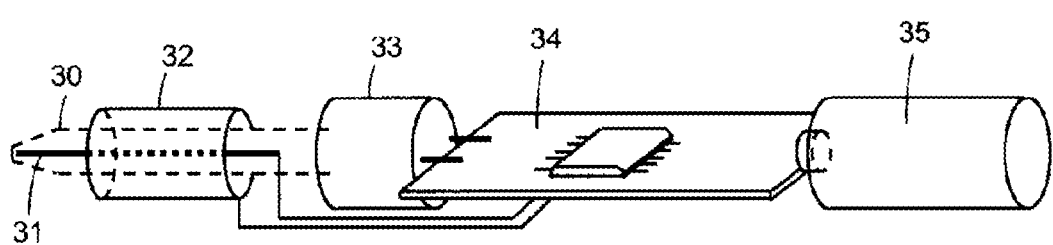
FIG. 4 is a diagram showing an internal structure example of a stylus pen used in a position detecting device according to one or more embodiments of this disclosure.

FIG. 4 shows an internal structure example of the stylus pen 15 used in the present embodiment. In FIG. 4, a core 30 is provided at the tip part and an electrode 31 is buried inside the core 30. At the periphery of the core 30 excluding the tip part, a shield electrode 32 is provided to surround the core 30. The shield electrode 32 is connected to a part at which the potential is most stable (GND; ground electrode) in the circuit. This shield electrode 32 has an effect of preventing a detected coordinate value from deviating even when the stylus pen 15 is put with a tilt on the transparent sensor 12.

Numeral 33 denotes a variable-capacitance capacitor that is physically coupled to the core 30 and whose capacitance changes depending on the writing pressure applied through the core 30. Numeral 34 denotes a printed circuit board and numeral 35 denotes a battery. An oscillation circuit that oscillates at a constant frequency is provided on the printed circuit board 34 and the oscillation output thereof is supplied to the electrode 31. The writing pressure applied to the variable-capacitance capacitor 33 is turned to a binary code by an operation to be described later to control the oscillation circuit and thereby an ASK-modulated signal is output. An ASK modulation circuit for this purpose is also provided on the printed board 34.

Figure 5:
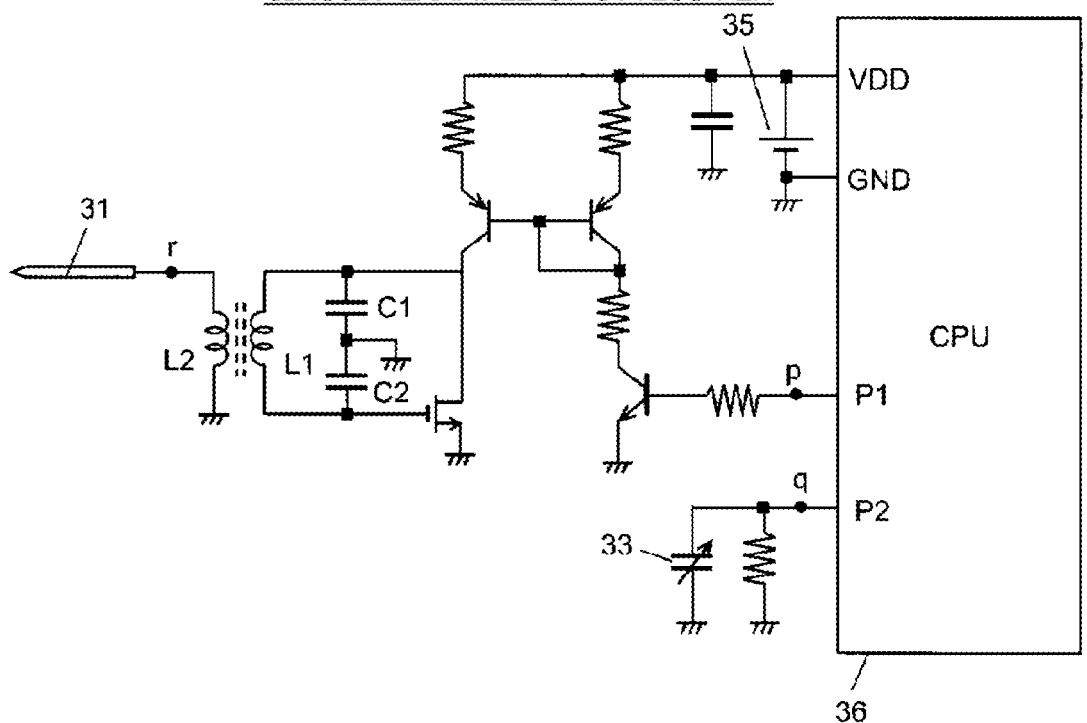
FIG. 5 is a diagram showing a circuit example of the stylus pen of the example of FIG. 4.

FIG. 5 shows one example of the circuit of the stylus pen 15. In FIG. 5, the same component as FIG. 4 is represented by the same symbol. Numeral 31 denotes the electrode provided at the tip part of the stylus pen 15. Numeral 35 denotes the battery and numeral 33 denotes the variable-capacitance capacitor whose capacitance changes depending on the writing pressure. In FIG. 5, a coil L1, a capacitor C1, and a capacitor C2 form part of the oscillation circuit and the oscillation output thereof is induced to a coil L2 coupled to the coil L1 and is supplied to the electrode 31.

In FIG. 5, numeral 36 denotes a central processing unit (CPU), and it operates in accordance with a predetermined program. A control signal p from an output terminal P1 of the CPU 36 is connected to the above-described oscillation circuit and controls the oscillation to an activated state or a stopped state. The oscillation circuit stops the oscillation when the control signal p is at the low level "0," and carries out the oscillation when the control signal p is at the high level "1." The variable-capacitance capacitor 33 is connected in parallel to a resistor and is connected to a terminal P2 of the CPU 36. The operation of the stylus pen 15 will be described in such a manner that the signal of this terminal P2 is defined as q and the signal supplied to the electrode 31 is defined as r.

Figure 6:
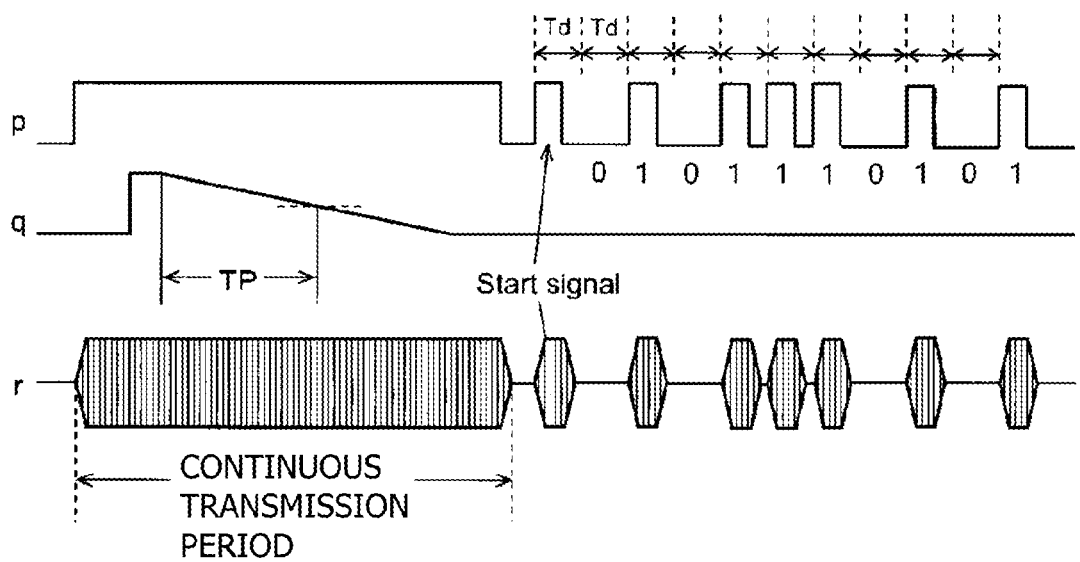
FIG. 6 is a signal waveform diagram in the circuit example of the stylus pen in FIG. 5.

FIG. 6 shows the respective waveforms of the signals p, q, and r in FIG. 5. The CPU 36 keeps output of the high level "1" as the signal p for a certain period to continue the operation of the oscillation circuit. In this period, coordinate detection operation to be described later is carried out on the position detecting device side. Furthermore, the CPU 36 detects the writing pressure applied to the variable-capacitance capacitor 33 in the continuous transmission period during which this signal p is at the high level "1." To carry out this writing pressure detection, the CPU 36 sets the terminal P2 to the output of the high level "1" after starting the above-described continuous transmission. This causes the signal q to become the high level "1" and the variable-capacitance capacitor 33 is charged by the voltage of the battery 35.

Upon the completion of this charge, the CPU 36 sets the terminal P2 to the input setting, i.e. a high-impedance setting. The charge accumulated in the variable-capacitance capacitor 33 is thereby discharged by the resistor connected in parallel to the variable-capacitance capacitor 33 and therefore the voltage of the signal q, i.e. the terminal P2, gradually decreases. When the voltage of the terminal P2 becomes a predetermined threshold voltage or lower in the CPU 36, the internal logic becomes the low level. The CPU 36 measures, as Tp (see FIG. 6), the time from the switching of the terminal P2 to the input setting to the reaching of the voltage of the terminal P2 to the above-described threshold or lower. This time Tp changes depending on the capacitance of the variable-capacitance capacitor 33, i.e. the magnitude of the writing pressure. Therefore, the CPU 36 obtains the time Tp measured in the range from zero to the maximum of the writing pressure as a 10-bit digital value.

After the end of the above-described continuous transmission period, a little later the CPU 36 carries out ASK modulation by controlling the terminal P1 according to this 10-bit writing pressure data. Specifically, the CPU 36 sets the terminal P1 to the low level when the data is "0" and sets it to the high level when the data is "1." In FIG. 6, a start signal as the first data is sent out as "1" invariably. The purpose of this is to enable the microprocessor 23 to correctly predict the timing of subsequent data. In FIG. 6, a time Td is the cycle at which one-bit data is sent out.

Next, a description will be made about how the position detecting device of the present embodiment configured in this manner detects the coordinate position and writing pressure data of the stylus pen 15.

[Example of Detection Processing of Indicated Position by Stylus Pen 15]

Figure 7:
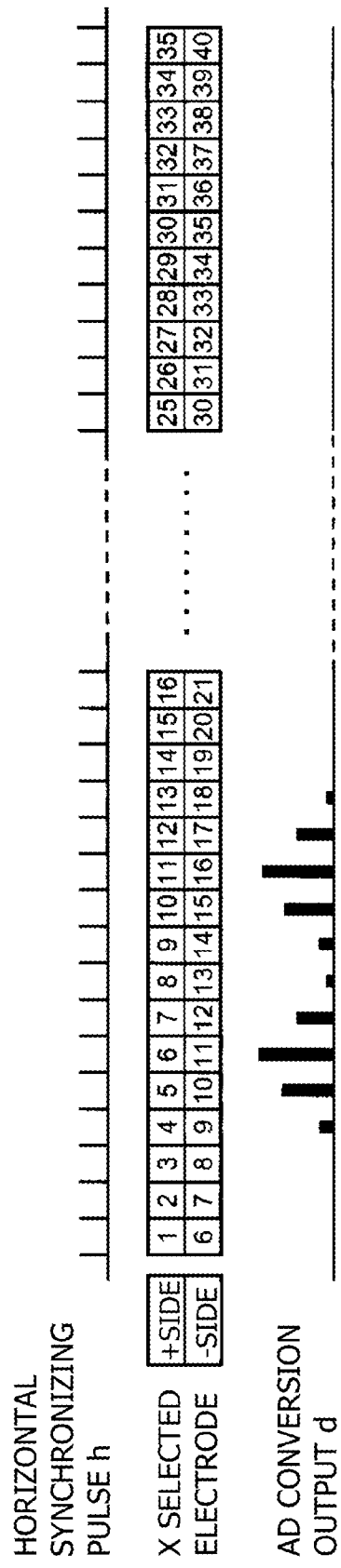
FIG. 7 is a diagram showing an X-axis whole-surface scan operation in a position detecting device according to one or more embodiments of this disclosure.

FIG. 7 shows an X-axis whole-surface scan operation. Specifically, FIG. 7 shows the X-axis whole-surface scan operation in which the X-electrode selection circuit 13 sequentially selects all X-electrodes and receives a signal and thereby an approximate position at which the stylus pen 15 is put is obtained. First, the microprocessor 23 outputs the control signal g to the control circuit 18 to carry out control to cause the switching circuit 16 to select the X-side and to select the X-electrode X1 for connection to the positive terminal side of the differential amplification circuit 17 and select, in this example, the X-electrode X6 located across four electrodes from the X-electrode on the positive terminal side for connection to the negative terminal of the differential amplification circuit 17.

Next, the microprocessor 23 carries out control to increment each of the numbers of the electrodes selected by the X-electrode selection circuit 13 and select the X-electrode X2 and the X-electrode X7 for connection to the positive terminal and the negative terminal of the differential amplification circuit 17, respectively. In this state, the signal level is obtained similarly to the above description. At this time, signal reception and AD conversion are carried out in synchronization with the horizontal synchronizing pulse h.

Similarly, the microprocessor 23 obtains the signal level while sequentially incrementing the numbers of the X-electrodes selected by the X-electrode selection circuit 13 and carries out this operation until the selection for connection to the positive terminal of the differential amplification circuit 17 becomes the X-electrode X35 and the selection for connection to the negative terminal of the differential amplification circuit 17 becomes the X-electrode X40.

If the value of the AD conversion output d does not reach a certain level in the above-described all cases at this time, the microprocessor 23 determines that the stylus pen 15 does not exist on the transparent sensor 12, and repeats the above-described X-axis whole-surface scan operation.

Moreover, in FIG. 7, the case in which the stylus pen 15 is put near the X-electrode X11 of the transparent sensor 12 is shown. In this case, as shown in FIG. 7, the signal levels of the AD conversion output d have a peak value when the X-electrode X11 is selected for connection to either the positive terminal or the negative terminal of the differential amplification circuit 17 by the X-electrode selection circuit 13. The approximate position of the stylus pen 15 can be obtained from the distribution of the signal levels when the selection of the X-electrode is updated in this manner. When it turns out that the stylus pen 15 is put near the X-electrode X11 from the signal level distribution of FIG. 7, subsequently transition operation to partial scan is carried out.

In the X-axis whole-surface scan operation shown in FIG. 7, the interval corresponding to four electrodes is set between the electrode selected by the X-electrode selection circuit 13 for connection to the positive terminal of the differential amplification circuit 17, and the electrode selected by the X-electrode selection circuit 13 for connection to the negative terminal of the differential amplification circuit 17. However, the number of electrodes may be set to a number other than four.

FIG. 8 shows the transition operation to partial scan. The timing when the stylus pen 15 enters the continuous transmission period in FIG. 6 is detected. In addition, the Y-direction approximate position of the stylus pen 15 in the transparent sensor 12 is obtained. Also at this time, that signal reception and AD conversion are carried out in synchronization with the horizontal synchronizing pulse h is the same as the above description.

First, the microprocessor 23 outputs the control signal g to the control circuit 18 to carry out control to cause the switching circuit 16 to select the X-side and to cause the X-electrode selection circuit 13 to select the X-electrode X11 and the X-electrode X16 for connection to the positive terminal and the negative terminal of the differential amplification circuit 17, respectively. When the stylus pen 15 enters the continuous transmission period shown in FIG. 6 at this time, the signal level output from the AD conversion circuit 22 repeatedly becomes a predetermined value or higher. When the signal level is detected beyond the predetermined value repeatedly for a predetermined time Ts (see FIG. 8) or longer, the microprocessor 23 determines that the stylus pen 15 has entered the continuous transmission period, and makes transition to Y-axis whole-surface scan operation. This predetermined time Ts is set to a time sufficiently longer than the cycle Td of transmission by the stylus pen 15 in the data transmission period.

In order to carry out a Y-axis whole-surface scan operation, the microprocessor 23 outputs the control signal g to the control circuit 18 to cause the switching circuit 16 to select the Y-side and to cause the Y-electrode selection circuit 14 to select the Y-electrode Y1 and the Y-electrode Y6 for connection to the positive terminal and the negative terminal of the differential amplification circuit 17, respectively. Subsequently, the microprocessor 23 obtains the signal level while incrementing the numbers of the electrodes selected by the Y-electrode selection circuit 14 one by one similarly to the X-axis whole-surface scan, and carries out this operation until the positive terminal is connected to the Y-electrode Y25 and the negative terminal is connected to the Y-electrode Y30. Also at this time, similarly to the X-axis whole-surface scan, a signal distribution is obtained in which the signal level of the AD conversion output d has a peak value when the electrode near the stylus pen 15 is selected for connection to either the positive terminal or the negative terminal of the differential amplification circuit 17. In the present embodiment, the following description will be made based on the assumption that the stylus pen 15 is put near the Y-electrode Y20.

By the operation of FIG. 7 and FIG. 8 described above, it turns out that the stylus pen 15 is put near the intersection of the X-electrode X11 and the Y-electrode Y20. Subsequently, the microprocessor 23 makes a transition to a partial scan operation in which five X-electrodes centered at the X-electrode X11 and five Y-electrodes centered at the Y-electrode Y20 are sequentially selected and the signal level is obtained.

FIG. 9 is a diagram showing the partial scan operation. When the signal level output from the AD conversion circuit 22 is equal to or higher than a predetermined value for the predetermined time Ts continuously in the state in which the X-electrode selection circuit 13 selects the X-electrode X11 and the X-electrode X16 for connection to the positive terminal and the negative terminal of the differential amplification circuit 17, the microprocessor 23 determines that the period of continuous transmission from the stylus pen 15 has been started, and makes a transition to the coordinate detection operation (step 1 in FIG. 9). This time Ts is similar to that described in FIG. 8 and is set to a time sufficiently longer than the cycle Td of the digital signal transmitted by the stylus pen 15 in the data transmission period.

In order to obtain the X-coordinate of the stylus pen 15, in the state in which the switching circuit 16 selects the X-side, the microprocessor 23 causes the X-electrode selection circuit 13 to sequentially select five X-electrodes centered at the X-electrode X11 (X9 to X13) for connection to the positive terminal of the differential amplification circuit 17 and reads the signal level (step 1). At this time, the X-electrodes X14 to X18 are selected by the X-electrode selection circuit 13 as X-electrodes for connection to the negative terminal of the differential amplification circuit 17, which are sufficiently separated from the X-electrodes selected by the X-electrode selection circuit 13 for connection to the positive terminal of the differential amplification circuit 17.

In the present embodiment, four times of detection are carried out regarding the same electrodes and the average level thereof is stored as the received-signal level.

In FIG. 9, the number of the X-electrode selected for connection to the positive terminal of the differential amplification circuit 17 when the highest signal level is detected (here, X11) and the signal level VPX thereof are stored. Furthermore, the levels detected with both adjacent X-electrodes thereof are stored as VAX and VBX (step 1).

Next, in order to obtain the Y-coordinate of the stylus pen 15, with the switching circuit 16 caused to select the Y-side, the microprocessor 23 causes the Y-electrode selection circuit 14 to sequentially select five Y-electrodes centered at the Y-electrode Y20 (Y18 to Y22) for connection to the positive terminal of the differential amplification circuit 17 and reads the signal level (step 1). At this time, the Y-electrode selection circuit 14 selects the Y-electrodes Y23 to Y27 as Y-electrodes for connection to the negative terminal of the differential amplification circuit 17, which are sufficiently separated from the Y-electrodes selected by the Y-electrode selection circuit 14 for connection the positive terminal of the differential amplification circuit 17. Also at this time, signal reception and AD conversion are carried out in synchronization with the horizontal synchronizing pulse h. In addition, four times of detection are carried out regarding the same electrodes and the average level thereof is stored as the received-signal level.

Furthermore, the number of the Y-electrode selected for connection to the positive terminal of the differential amplification circuit 17 when the highest signal level is detected (here, Y20) and the signal level VPY thereof are stored. Furthermore, the levels detected with both adjacent electrodes thereof are stored as VAY and VBY (step 1).

The signal levels VPX, VAX, VBX, VPY, VAY, and VBY obtained here are used for calculation of coordinate values based on calculation expressions to be described later.

Subsequently, the microprocessor 23 carries out an operation for waiting for the end of the period of continuous transmission from the stylus pen 15. The microprocessor 23 carries out control to cause the switching circuit 16 to select the X-side. In addition, the microprocessor 23 carries out control to cause the X-electrode selection circuit 13 to select the X-electrode X11, with which the peak is detected in the above-described coordinate detection operation, for connection to the positive terminal of the of the differential amplification circuit 17 and to select the X-electrode X16 for connection to the negative terminal of the differential amplification circuit 17. The clock time when the level of the signal received in this state becomes lower than the predetermined value is the end clock time of the period of continuous transmission from the stylus pen 15 (step 1).

Next, a method for obtaining the coordinate position of the stylus pen 15 from the reception levels obtained in the above-described step 1 will be described.

From the reception levels VPX, VAX, VBX, VPY, VAY, and VBY obtained in step 1, the coordinate values (X, Y) of the stylus pen 15 are each calculated by the following expressions.

$$X=Px+(Dx/2)\times((VBX-VAX)/(2\times VPX-VAX-VBX)) \quad \text{(Expression 1)}$$

Px is the coordinate position of the X-electrode with which the maximum level is detected in the X-axis (here, X11), and Dx is the arrangement pitch between the X-electrodes.

$$Y=Py+(Dy/2)\times((VBY-VAY)/(2\times VPY-VAY-VBY)) \quad \text{(Expression 2)}$$

Py is the coordinate position of the Y-electrode with which the maximum level is detected in the Y-axis (here, Y20), and Dy is the arrangement pitch between the Y-electrodes.

The above-described calculation expressions, (Expression 1) and (Expression 2), are one example and are not necessarily the optimum method. The optimum calculation method changes also depending on the width and pitch of the X-electrodes and the Y-electrodes and the electrode shape of the stylus pen 15.

In the above-described embodiment, in the detection processing of the position indicated by the stylus pen 15 in step 1, the electrodes selected by the X-electrode selection circuit 13 and the Y-electrode selection circuit 14 for connection to the positive terminal of the differential amplification circuit 17 are near the stylus pen 15. However, the electrodes selected by the X-electrode selection circuit 13 and the Y-electrode selection circuit 14 for connection to negative terminal of the differential amplification circuit 17 may near the stylus pen 15. Furthermore, the electrodes selected by the X-electrode selection circuit 13 and the Y-electrode selection circuit 14 for connection to the positive terminal and the negative terminal of the differential amplification circuit 17 have four electrodes therebetween. However, the electrodes selected by the X-electrode selection circuit 13 and the Y-electrode selection circuit 14 for connection to the positive terminal and the negative terminal of the differential amplification circuit 17 may have another number of electrodes therebetween. It is preferable that the two electrodes selected by the X-electrode selection circuit 13 and the Y-electrode selection circuit 14 for connection to the positive terminal and negative terminal of the differential amplification circuit 17 be located across such a number of electrodes as to provide an interval somewhat wider than the radiation region of an electric field radiated from the electrode 31 of the stylus pen 15.

In the above-described embodiment, coordinate detection on the X-axis side and coordinate detection on the Y-axis side regarding the position indicated by the stylus pen 15 are carried out with switching by the switching circuit 16. However, the differential amplification circuit, the AD conversion circuit, and so forth may be provided on the X-axis side and the Y-axis side separately and reception processing may be simultaneously executed.

In the above-described embodiment, one electrode is selected by each of the X-electrode selection circuit 13 and the Y-electrode selection circuit 14 for connection to the positive terminal and negative terminal of the differential amplification circuit 17, respectively. However, the same number of plural electrodes may be simultaneously selected.

In the present embodiment, the signal level is obtained four times regarding the same electrodes in the partial scan to obtain the X-coordinate and Y-coordinate of the position indicated by the stylus pen 15. However, the signal level may be obtained one time regarding the same electrodes or another number of times may be employed.

[Example of Detection Processing of Attendant Information from Stylus Pen 15]

Next, an example of detection processing of writing pressure data as an example of attendant information transmitted from the stylus pen 15 will be described. In the position detecting device of this embodiment, detection of attendant information is carried out based on a signal from the stylus pen 15 received by an electrode or an electrode group fixedly selected by either the X-electrode selection circuit 13 or the Y-electrode selection circuit 14. The fixedly-selected electrode or electrode group is selected in such a manner that the X-electrode or Y-electrode detected in the vicinity of the indicated position of the stylus pen 15 by position detection processing (X-axis whole-surface scan or Y-axis whole-surface scan) is included in either the positive terminal or negative terminal of the differential amplification circuit 17. In the following description, explanation will be made as the case in which detection of attendant information is carried out based on a signal from the X-electrode or X-electrode group selected by the X-electrode selection circuit 13.

When detecting the end of the period of continuous transmission from the stylus pen 15, the microprocessor 23 starts an operation of detecting the timing of the start signal shown in FIG. 6, transmitted prior to writing pressure data (step 2).

At this time, as shown in FIG. 9, the clock time when the signal level has become equal to or higher than the above-described predetermined value is stored as t1. The microprocessor 23 starts an operation of receiving data from the stylus pen 15 from the clock time after waiting for a certain time Tw from the clock time t1 (step 2). This time Tw is defined as the time until the level of the received signal almost disappears after the end of transmission of the start signal from the stylus pen 15, and is set to a time obtained in advance.

The microprocessor 23 activates a timer, not shown in the diagram, simultaneously with the reaching of the above-described waiting time to the time Tw. This timer repeatedly counts the time from zero to the value corresponding with the above-described time Td (cycle of data transmission from the stylus pen 15) (step 2). In the operation period of one cycle of the timer, the microprocessor 23 repeatedly carries out signal reception and AD conversion and reads the signal level. If the signal level during this period never reaches the above-described predetermined value, the microprocessor 23 determines that transmission from the stylus pen 15 is absent, and stores the data of this round as "0." If a signal level equal to or higher than the predetermined value is detected in the period, the microprocessor 23 determines that transmission from the stylus pen 15 is present, and stores the data of this round as "1" (step 2).

The above-described count of the timer is made ten times and 10-bit data is stored. This 10-bit data corresponds to the 10-bit writing pressure data shown in FIG. 7. In FIG. 9, the case in which the writing pressure data is "0101110101" is shown.

Upon the end of reception of the 10-bit writing pressure data in step 2, transition is made to the operation of detecting the start of the period of continuous transmission from the stylus pen 15 (step 1) and the microprocessor 23 repeatedly carries out the operation of FIG. 9.

<Selection of Electrodes in Detection Processing of Attendant Information>

Conventionally, in detection of attendant information, two electrodes separated by the same interval as the electrodes selected to be connected to the positive terminal and the negative terminal in the period to detect the position of the stylus pen 15 are selected. However, one of the electrodes is the electrode detected as the vicinity of the indicated position of the stylus pen 15 by position detection processing.

FIG. 10 is a diagram for explaining the selection state in the X-electrode selection circuit 13 at the time of this existing detection processing of attendant information. As described above, in this embodiment, the electrode near the position indicated by the stylus pen 15 is the X-electrode X11. Thus, the positive terminal of the differential amplification circuit 17 is connected to this X-electrode X11 and the X-electrode X16 located across four electrodes from the X-electrode X11 is connected to the negative terminal of the differential amplification circuit 17.

Thus, the interval between the electrode connected to the positive terminal and the electrode connected to the negative terminal is large and the detection processing becomes more susceptible to noise in the selection method of electrodes in the example of FIG. 10. Therefore, in this embodiment, at the time of detection processing of attendant information, the selection of the electrodes connected to the positive terminal and the negative terminal of the differential amplification circuit 17 by the X-electrode selection circuit 13 (same applies also to the case of the Y-electrode selection circuit 14) is changed from the selection at the time of detection of the indicated position of the stylus pen 15, and a shorter interval than the interval between the electrodes connected to the positive terminal and the negative terminal at the time of detection of the indicated position of the stylus pen 15 is employed.

For example, as shown in FIG. 11, although that the X-electrode X11 near the indicated position of the stylus pen 15 is employed as the X-electrode connected to the positive terminal is the same, the microprocessor 23 controls the X-electrode selection circuit 13 so that the X-electrode X14 located across two electrodes from the X-electrode connected to the positive terminal may be employed as the electrode connected to the negative terminal.

According to this example of FIG. 11, two electrodes whose interval is shorter than in the position detection processing are selected to be connected to the positive terminal and negative terminal of the differential amplification circuit 17. Thus, noise of these two electrodes is approximate and the effect of noise reduction becomes larger, which makes it possible to detect the attendant information more correctly.

However, along with an increase in the number of bits of the attendant information due to addition of identification information and so forth besides the writing pressure data as the attendant information transmitted from the stylus pen 15, the transmission time of the attendant information from the stylus pen 15 becomes longer. This makes it difficult to acquire the attendant information when the stylus pen 15 moves at high speed. Therefore, in this embodiment, as described below, as each of the electrodes connected to the positive terminal and negative terminal of the differential amplification circuit 17, not one electrode but an electrode group composed of plural electrodes is employed. This allows solving of the problem of the above-described noise and the problem of the difficulty in acquisition of attendant information when the stylus pen 15 moves at high speed. In this case, the number of electrodes forming a first electrode group and the number of electrodes forming a second electrode group are set to the same number.

<First Example of Electrode Selection>

Figure 12:
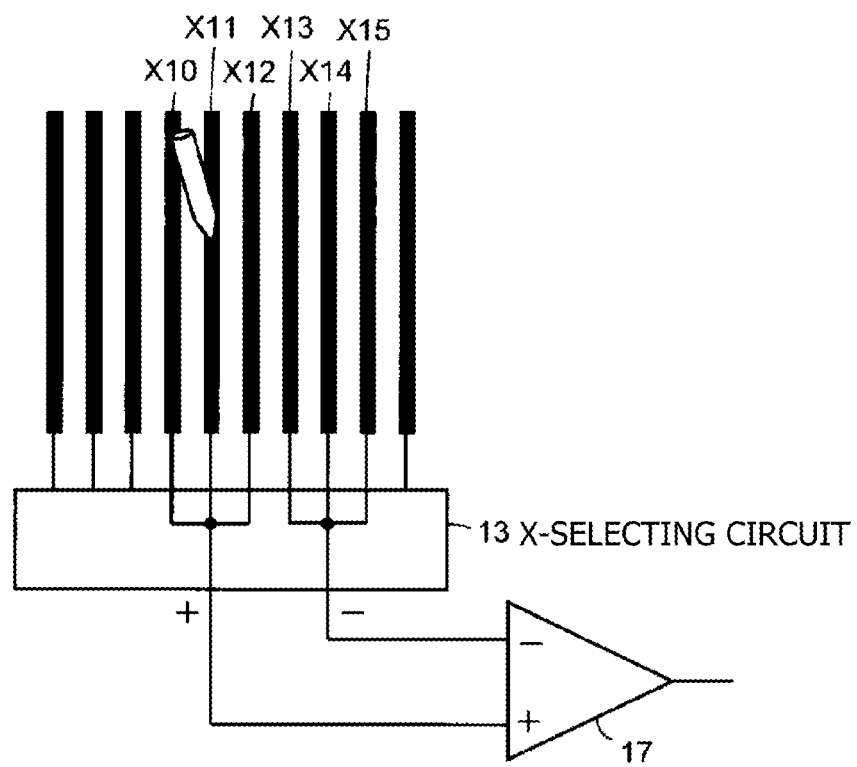
FIG. 12 is a diagram for explaining an example of a selection method of electrodes in detection processing of attendant information in a position detecting device according to one or more embodiments of this disclosure.

FIG. 12 shows a first example of electrode selection at the time of detection processing of attendant information. In this example of FIG. 12, the X-electrode selection circuit 13 is controlled by the microprocessor 23 to connect, as the first electrode group, three electrodes of the X-electrode X11 near the indicated position of the stylus pen 15 detected by position detection processing and the X-electrode X10 and the X-electrode X12 on both adjacent sides of the X-electrode X11 to the positive terminal of the differential amplification circuit 17 and connect, as the second electrode group, three electrodes of the X-electrode X14 located across two electrodes from the X-electrode X11 and the X-electrode X13 and the X-electrode X15 on both adjacent sides of the X-electrode X14 to the negative terminal of the differential amplification circuit 17. In step 2 of FIG. 9, the selected electrodes in the case of this example are shown.

If the electrodes are selected in this manner, the X-electrode X11 is near the indicated position of the detected stylus pen 15 and, even when the stylus pen 15 moves from the X-electrode X11 by moving at high speed, the signal from the stylus pen 15 can be received by the X-electrode X10 or the X-electrode X12 on both sides of the X-electrode X11. Therefore, the position detecting device can acquire all of the attendant information from the stylus pen 15.

Furthermore, in the case of this example of FIG. 12, the first electrode group composed of the X-electrodes X10, X11, and X12 connected to the positive terminal of the differential amplification circuit 17 and the second electrode group composed of the X-electrodes X13, X14, and X15 connected to the negative terminal are adjacent. Therefore, noise included in both electrode groups is approximately the same and it becomes possible to effectively cancel the noise.

<Second Example of Electrode Selection>

Figure 13:
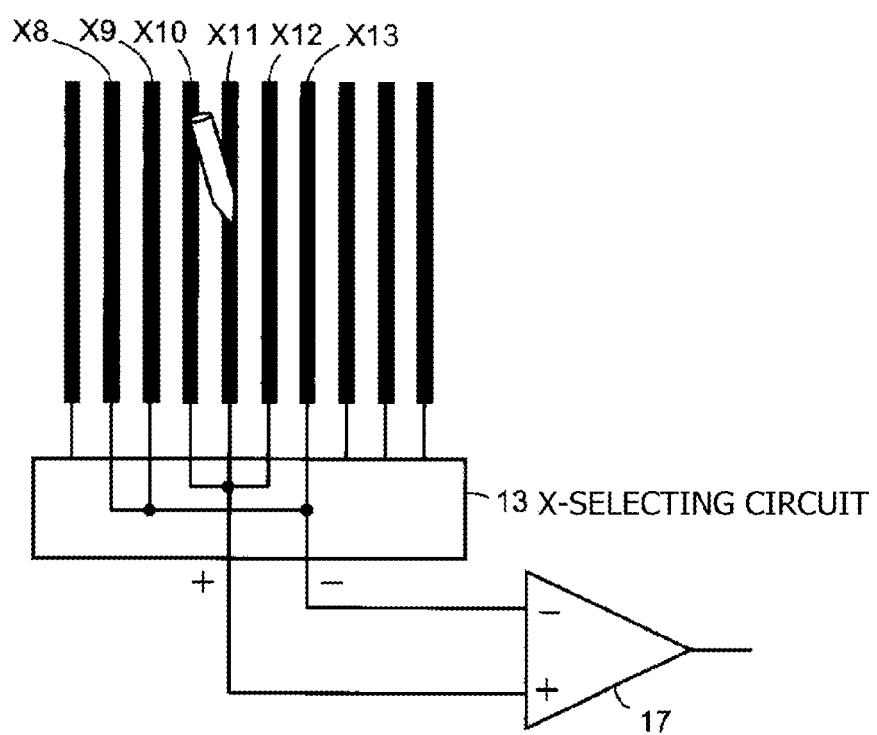
FIG. 13 is a diagram for explaining an example of a selection method of electrodes in detection processing of attendant information in a position detecting device according to one or more embodiments of this disclosure.

FIG. 13 shows a second example of electrode selection at the time of detection processing of attendant information. This example of FIG. 13 is the same as the first example in that the X-electrode selection circuit 13 is controlled by the microprocessor 23 to connect, as the first electrode group, three electrodes of the X-electrode X11 near the indicated position of the stylus pen 15 and the X-electrode X10 and the X-electrode X12 on both adjacent sides of the X-electrode X11 to the positive terminal of the differential amplification circuit 17.

Figure 14:
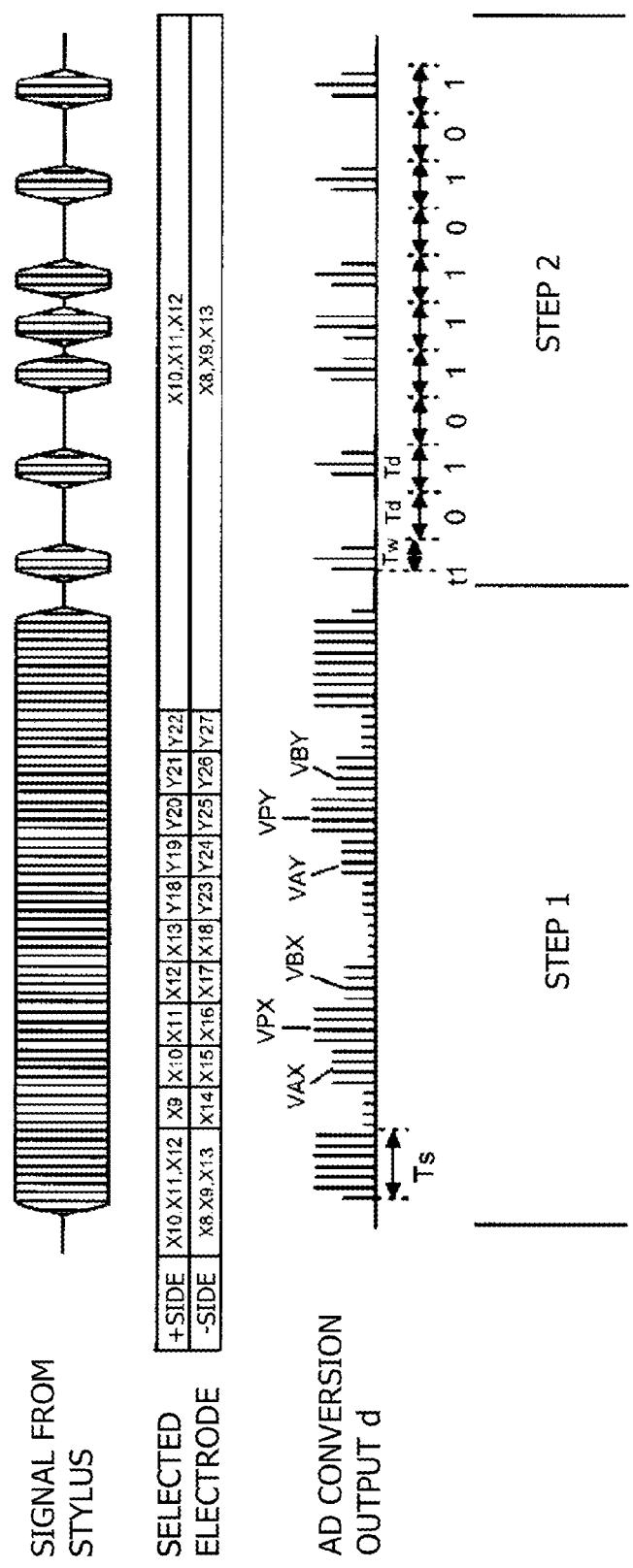
FIG. 14 is a diagram showing a partial scan operation in a position detecting device according to one or more embodiments of this disclosure.

In this second example, plural electrodes forming the second electrode group connected to the negative terminal of the differential amplification circuit 17 are set on both sides of the first electrode group. Specifically, in the example of FIG. 13, the X-electrode selection circuit 13 electrically connects the X-electrodes X8, X9, and X13 located on both sides of the first electrode group to form the second electrode group, and connects the second electrode group to the negative terminal of the differential amplification circuit 17. In FIG. 14, a timing chart at the time of partial scan operation in the case of this second example is shown.

In this second example, the position of the detected stylus pen 15 is at substantially the center of the plural electrodes composed of the first electrode group and the second electrode group, and it becomes possible to acquire the attendant information more surely even when the stylus pen 15 moves at higher speed. Furthermore, according to this second example, the electrodes connected to the positive terminal of the differential amplification circuit 17 and the electrodes connected to the negative terminal are closer than in the case of the first example. Thus, the noise reduction effect due to the differential amplification becomes larger than in the first example and the detection processing becomes robuster against noise.

<Third Example of Electrode Selection>

Figure 15:
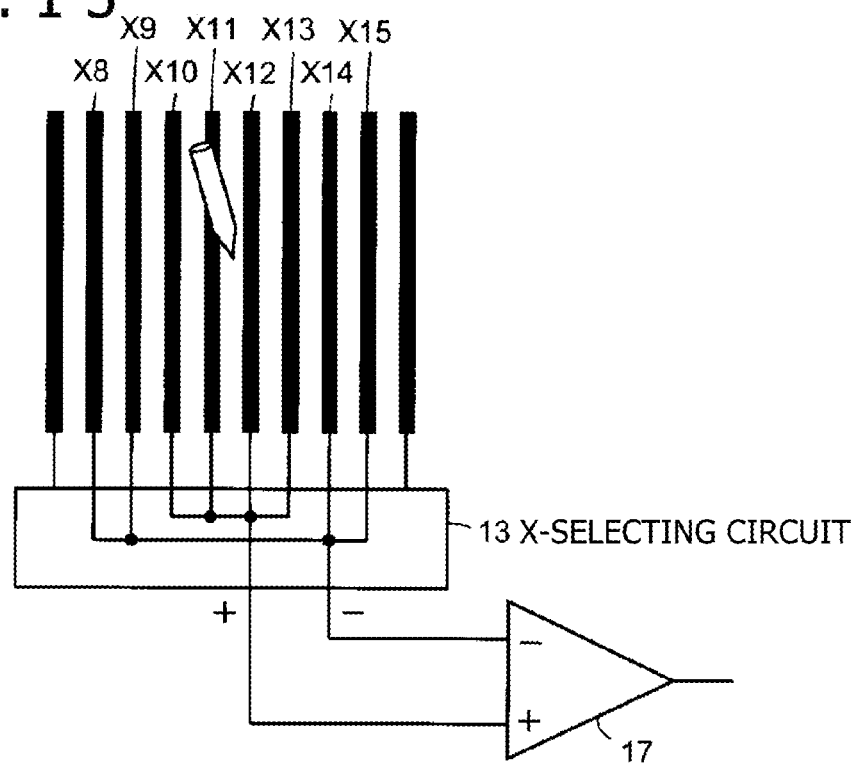
FIG. 15 is a diagram for explaining an example of a selection method of electrodes in detection processing of attendant information in a position detecting device according to one or more embodiments of this disclosure.

FIG. 15 shows a third example of electrode selection at the time of detection processing of attendant information and is a modification example of the second example. This third example is an example of the case of enabling reception of attendant information whichever side the stylus pen 15 moves toward at high speed when the position of the stylus pen 15 exists at an intermediate position between the X-electrode X11 and the X-electrode X12.

Specifically, in this third example, the X-electrode selection circuit 13 is controlled by the microprocessor 23 to connect electrodes as follows. Specifically, the position of the stylus pen 15 detected by position detection processing is deemed as the center and the X-electrodes X10, X11, X12, and X13 as two electrodes on each of both sides of the position are connected to the positive terminal of the differential amplification circuit 17 as the first electrode group. In addition, the X-electrodes X8, X9, X14, and X15 as two electrodes on each of both sides of the first electrode group are connected to the negative terminal of the differential amplification circuit 17. In FIG. 16, a timing chart at the time of partial scan operation in the case of this third example is shown.

In this embodiment, as shown in FIG. 9, FIG. 14, and FIG. 16, at the time of detection processing of attendant information, the first electrode group and the second electrode group that are each composed of plural X-electrodes are connected to the positive terminal and negative terminal of the differential amplification circuit 17. Thus, also whether the stylus pen 15 has entered the continuous transmission period is detected in the predetermined time Ts, the detection is carried out based on the difference between the first electrode group and the second electrode group, which are composed of plural X-electrodes. Therefore, it becomes possible to detect whether the stylus pen 15 has entered the continuous transmission period more easily than in the case of using the difference between electrodes as each one electrode as in the existing configuration.

Furthermore, according to the above-described first example to third example, in the detection processing of attendant information, the first electrode group and the second electrode group that are each composed of plural X-electrodes are connected to the positive terminal and negative terminal of the differential amplification circuit 17. Thus, there is also an effect that detection of the attendant information also becomes easier than in the case of using the difference between electrodes as each one electrode as in the existing configuration.

In the above-described explanation, the X-electrode X11, with which the maximum level has been detected, is selected from the X-electrodes and data is received in step 2, in which detection of attendant information is carried out. However, this may be carried out by selecting the Y-electrode Y20, with which the maximum level has been detected among the Y-electrodes.

Moreover, in the above-described embodiment, the positive terminal side is caused to include the electrode near the stylus pen 15 as the electrode selected by the X-electrode selection circuit 13 and the Y-electrode selection circuit 14. However, the electrodes may be so selected that the negative terminal side includes the electrode near the stylus pen 15.

DESCRIPTION OF REFERENCE SYMBOLS

11 . . . LCD panel,
12 . . . Transparent sensor,
13 . . . X-electrode selection circuit,
14 . . . Y-electrode selection circuit,
15 . . . Stylus pen,
16 . . . Switching circuit,
17 . . . Differential amplification circuit,
23 . . . Microprocessor

The invention claimed is:

1. A position detecting device having a transparent sensor that includes a plurality of electrodes composed of a transparent electrically-conductive material arranged in each of a first direction and a second direction intersecting each other and that is disposed over a display device, the position detecting device receiving a position detection signal by which a position on the sensor is detected and a data signal generated according to digital data from a stylus pen, the data signal being different from the position detection signal, the position detecting device comprising:
    a differential amplification circuit that has a first terminal and a second terminal and, in operation, amplifies and outputs a difference between a signal at the first terminal and a signal at the second terminal; and
    a selection circuit that, in operation, selects a first electrode group including at least a first electrode of the electrodes included in the sensor, connects the first electrode group to the first terminal, selects a second electrode group including at least a second electrode of the electrodes included in the sensor, and connects the second electrode group to the second terminal;
    wherein the selection circuit selects electrodes separated by a first interval or a second interval based on whether the stylus pen transmits the position detection signal or the data signal,
    wherein the selection circuit, in operation, selects electrodes separated by the first interval as the first electrode and the second electrode in a first period of time in which the position on the sensor indicated by the stylus pen is detected based on the position detection signal transmitted from the stylus pen, while the stylus pen transmits the position detection signal during the first period of time, and the selection circuit, in operation, selects electrodes separated by the second interval as the first electrode and the second electrode in a second period of time in which the data signal transmitted from the stylus pen is detected, while the stylus pen transmits the data signal during the second period of time, the second interval being different from the first interval.

2. The position detecting device according to claim 1, wherein the first electrode or the second electrode selected by the selection circuit in the second period of time in which the data signal is detected is an electrode at the position on the sensor indicated by the stylus pen, detected in the first period of time in which the position indicated by the stylus pen is detected, or is adjacent to the position on the sensor indicated by the stylus pen.

3. The position detecting device according to claim 1, wherein, in the second period of time in which the data signal is detected, the selection circuit, in operation, selects electrodes or electrode groups adjacent to each other as the first electrode group or the second electrode group.

4. The position detecting device according to claim 1, wherein the electrodes selected by the selection circuit in the second period of time in which the data signal is detected are the first electrode group and the second electrode group, and a first one of the first electrode group and the second electrode group is composed of a plurality of electrodes adjacent to each other, and a plurality of electrodes of a second one of the first electrode group and the second electrode group is composed of electrodes dispersed on two sides of the electrode group composed of the plurality of electrodes adjacent to each other.

5. The position detecting device according to claim 1, wherein the stylus pen is provided with a writing pressure detecting circuit and the position detecting device receives a writing pressure value that is detected by the writing pressure detecting circuit and is transmitted from the stylus pen as the digital data.

6. The position detecting device according claim 1, wherein the stylus pen is provided with a switch and the position detecting device receives a state of the switch transmitted from the stylus pen as the digital data.

7. The position detecting device according to claim 1, wherein the position detecting device receives identification information of the stylus pen transmitted from the stylus pen as the digital data.

8. The position detecting device according to claim 1, wherein the data signal is transmitted from the stylus pen and is obtained by amplitude shift keying modulation of an alternating-current signal according to the digital data.

9. The position detecting device according to claim 1, wherein the position detecting device receives the position detection signal and the digital data from the stylus pen based on electric field coupling between an electrode of the sensor and the stylus pen.

10. The position detecting device according to claim 1, wherein the second interval between the first electrode and the second electrode in the second period of time in which the data signal is detected is variable.

11. The position detecting device according to claim 1, wherein the electrodes selected by the selection circuit in the second period of time in which the data signal is detected are the first electrode group and the second electrode group, and a number of electrodes forming the first electrode group and the second electrode group is variable.

12. The method according to claim 1, wherein the data signal is obtained by amplitude shift keying modulation of an alternating-current signal according to digital data.

13. A method of operating a position detecting device having a transparent sensor that includes a plurality of electrodes composed of a transparent electrically-conductive material arranged in each of a first direction and a second direction intersecting each other and that is disposed over a display device, the method comprising:
detecting, during a first period of time, a position detection signal transmitted by a stylus pen;
detecting, during a second period of time, a data signal transmitted by the stylus pen, the data signal being different from the position detection signal, and the second period of time being different from the first period of time;
selecting electrodes separated by a first interval or a second interval based on whether the stylus pen transmits the position detection signal or the data signal;
wherein, during the first period of time, a first electrode group including at least a first electrode of the electrodes included in the sensor is selected by the selecting, while the stylus pen transmits the position detection signal during the first period of time;
connecting, during the first period of time, the first electrode group to a first terminal;
wherein, during the first period of time, a second electrode group including at least a second electrode of the electrodes included in the sensor is selected by the selecting, while the stylus pen transmits the position detection signal during the first period of time;
connecting, during the first period of time, the second electrode group to a second terminal;
amplifying and outputting, during the first period of time, a difference between a signal at the first terminal and a signal at the second terminal;
detecting a position on the sensor indicated by the stylus pen based on the amplifying and outputting, during the first period of time, of the difference between the signal at the first terminal the signal at the second terminal during the first period of time;
wherein, during the second period of time, a third electrode group including at least a third electrode of the electrodes included in the sensor is selected by the selecting, while the stylus pen transmits the data signal during the second period of time;
connecting, during the second period of time, the third electrode group to the first terminal;
wherein, during the second period of time, a fourth electrode group including at least a fourth electrode of the electrodes included in the sensor is selected by the selecting, while the stylus pen transmits the data signal during the second period of time, wherein an interval between the third electrode and the fourth electrode is different from an interval between the first electrode and the second electrode;
connecting, during the second period of time, the fourth electrode group to the second terminal;
amplifying and outputting, during the second period of time, the difference between the signal at the first terminal and the signal at the second terminal; and
detecting data transmitted by the stylus pen based on the amplifying and outputting, during the second period of time, of the difference between the signal at the first terminal the signal at the second terminal.

14. The method according to claim 13, wherein the third electrode or the fourth electrode is an electrode at the position on the sensor indicated by the stylus pen, or is adjacent to the position on the sensor indicated by the stylus pen.

15. The method according to claim 13, wherein the third electrode group or the fourth electrode group includes a plurality of adjacent electrodes.

16. The method according to claim 13, wherein a first one of the third electrode group and the forth electrode group includes a plurality of adjacent electrodes, and a plurality of electrodes of a second one of the third electrode group and the fourth electrode group is composed of electrodes dispersed on two sides of the electrode group that includes the plurality of adjacent electrodes.

17. The method according to claim 13, further comprising:
   receiving the position detection signal transmitted by the stylus pen based on electric field coupling between an electrode of the sensor and the stylus pen.

18. The method according to claim 13, further comprising:
   receiving the data signal transmitted by the stylus pen based on electric field coupling between an electrode of the sensor and the stylus pen.

19. The method according to claim 13, further comprising:
   varying the interval between the third electrode and the fourth electrode group.

20. The method according to claim 13, further comprising:
   varying a number of electrodes forming the third electrode group and the fourth electrode group.

\* \* \* \* \*